United States Patent [19]

Middlebrook

[11] Patent Number: 4,888,463
[45] Date of Patent: Dec. 19, 1989

[54] THERMAL MICROSCOPE STAGE

[76] Inventor: Thomas F. Middlebrook, 184 S. Union St., Elgin, Ill. 60123

[21] Appl. No.: 93,740

[22] Filed: Sep. 8, 1987

[51] Int. Cl.⁴ .............................................. H05B 3/26
[52] U.S. Cl. ..................................... 219/201; 219/521; 219/385; 350/533
[58] Field of Search ................. 350/533; 219/20, 201, 219/521, 385, 386, 387, 433, 436, 438

[56] References Cited

U.S. PATENT DOCUMENTS

| 3,177,344 | 4/1965 | Morey | 219/433 |
| 4,269,862 | 12/1986 | Kitagawa | 219/385 |
| 4,674,846 | 6/1987 | Lippman | 350/533 |

FOREIGN PATENT DOCUMENTS

| 1283558 | 11/1968 | Fed. Rep. of Germany | 350/533 |
| WO87/03703 | 6/1987 | PCT Int'l Appl. | 350/533 |
| 358682 | 11/1972 | U.S.S.R. | 350/533 |
| 880922 | 10/1961 | United Kingdom | 350/533 |

OTHER PUBLICATIONS

"A Programmable Temperature-Controlled Microscope Stage . . . ", Reisman, S., IEEE Trans. on Biom. Eng., vol. BME-28, No. 1, Jan. 1981, pp. 44–46.

Primary Examiner—Teresa J. Walberg
Attorney, Agent, or Firm—Douglas B. White

[57] ABSTRACT

An apparatus for maintaining thermal control of the temperature of a microscope stage is provided. A thin copper plate is arranged with a non-inductive serpentine heating element pattern controlled by a proportional power controller. A thermistor temperature sensing device is arranged to sense the temperature near the specimen container and to provide the sensed data to the controller. Proportional power control is accomplished by varying the ratio of "ON" and "OFF" power cycles as the desired temperature is approached.

3 Claims, 3 Drawing Sheets

THERMAL MICROSCOPE STAGE

BACKGROUND OF THE INVENTION

1. Field of the Invention

The present invention relates generally to methods and apparatus for heating and maintaining temperature control of specimens under observation on a microscope stage. More particularly this invention relates to a device for maintaining very accurate temperature control around 37 degrees centigrade for purposes of biological research.

2. Description of the Prior Art

Prior methods for controlling the temperature of a specimen on a microscope stage have exhibited significant drawbacks. In one method an operator would merely sit with his microscope in a hot room which is controlled at the required temperature. The temperature of the specimens would then, presumably, be known to some accuracy and the operator would have full control over the microscope and all its accessories, such as manipulators and cameras. However, this system generally proved uncomfortable for the operator and accurate temperature control of the specimen was uncertain.

Another system proposed in the prior art required placing the microscope in a temperature controlled container from which the eye piece and the controls would protrude. Again, temperature control within the container proved uncertain and access to the specimen was difficult.

Consequently, efforts have been made in the industry to concentrate on a system providing specific local heat to the specimen. Efforts in this direction have been hampered by the limited dimensions available within which to provide the heater. Moreover, since the aperture in the microscope stage is quite large it interferes with the temperature control.

In one of such specimen heating systems, as shown in U.S. Pat. No. 3,472,726, there is provided a furnace having heating elements therein, a fan to pull cooling air past the specimen, an access opening for insertion of a microscope slide, and a heat deflecting lens through which the microscope will operate. But the elaborate nature and large size of this system has made it cumbersome and the temperature within the furnace difficult to control. Most importantly, however, it does not fit on a microscope.

In yet another device, described in U.S. Pat. No. 2,995,643, there is provided another version of the microscope oven. In this arrangement a chamber is described which is cooled by a water jacket to compensate for the thermal inertia of the system, and a heater is provided to circumscribe the specimen. An opening beneath the heating element is provided for insertion of a specimen slide. Again, the large size of this system yields limited versatility and it cannot be used with a traditional microscope stage.

More recently a device referred to as a Peltier unit has been developed and used for temperature control apparatus. These Peltier units are thermo-electric modules which either supply or remove heat depending on the polarity of the electrical connection. But, use of a Peltier unit on a microscope stage is difficult due to its size and opacity; and its temperature control is difficult due to the temperature overshoot and thermal lag involved in its control. This difficulty was dealt with in a recent improvement for temperature control apparatus. Although not used on microscope stages, U.S. Pat. No. 4,066,365 describes an electrical circuit having a cascade of Peltier units and a plurality of temperature sensors employed to minimize temperature overshoot and thermal lag.

The mainstay of the industry has been and currently is a water reservoir system such as that described in U.S. Pat. No. 2,228,906. In that device, a water container having a pump system and a heater device therewith is used to deliver water of a regulated temperature to a jacket in a microscope stage. In such a system, the temperature control of the microscope stage and the specimen are difficult due to heat loss between the reservoir and the stage. Further, since the heating function is performed in the water reservoir the thermal lag and overshoot create a significant problem.

As an alternative to the water reservoir, some attempts have been made to heat the microscope stage through other means. For one example, the stage has been heated with infra red radiation with little success. In yet another example, electrical heating coils have been used to generate the heat. One system uses a conducting plate to convey the heat to the microscope stage, while another wraps the coil around the stage. But both of these coil systems generate too much electrical inductance and thermal inertia for accurate temperature control. Absent a complicated controller such as that described in U.S. Pat. No. 4,066,365, these coil systems tend to overshoot the desired temperature and are of limited use.

Accordingly, it is a principle object of the present invention to provide an improved microscope stage which has low thermal inertia and which may be accurately brought up to a desired temperature with minimal overshoot.

It is a further object of the present invention to provide means for heating a microscope stage and providing temperature control in and about the aperture in the microscope stage attachment and to provide means for accurately heating and maintaining the temperature in a specimen dish.

It is yet another object of the present invention to provide thermal isolation means to thermally separate the heating stage attachment from the microscope stage.

Finally, it is an object of the present invention to provide a non-inductive thermal heating stage to eliminate magnetic fields and inductive effects.

SUMMARY OF THE INVENTION

Generally there is provided a thermal stage for attachment to a standard microscope stage including a thermally conductive planar member having a central aperture therein; and having an electrically isolated but thermally connected non-inductive heating pattern on the bottom side thereof. Electrical connections to the heating element and to a thermistor temperature sensor located proximate the aperture is provided through an access cable connected to a controller. This controller is designed to provide a proportional input to the heating element in response to the temperature sensed. In the preferred embodiment, this controller input is time proportional and has a fixed cycle time. As the controller supplies power to operate the heater, it senses the temperature near the stage aperture. When the sensed temperature is far below the desired set temperature, the controller supplies input power for a proportional ratio of "ON" cycles to "OFF" cycles. As a desired temperature is reached, a proportion of the "ON" cycles to "OFF" cycles approaches one to one.

In yet a further aspect of the present invention there is provided a thermal encasing ring affixed to the upper portion of the stage and surrounding the aperture for further stabilizing the temperature about the specimen dish.

While the invention will be described in connection with a preferred embodiment, it will be understood that I do not intend to limit the invention to that embodiment. On the contrary, I intend to cover all alternatives, modifications, and equivalents as may be included within the spirit and scope the invention as defined by the appended claims.

DESCRIPTION OF THE PREFERRED EMBODIMENT

Figure 1:
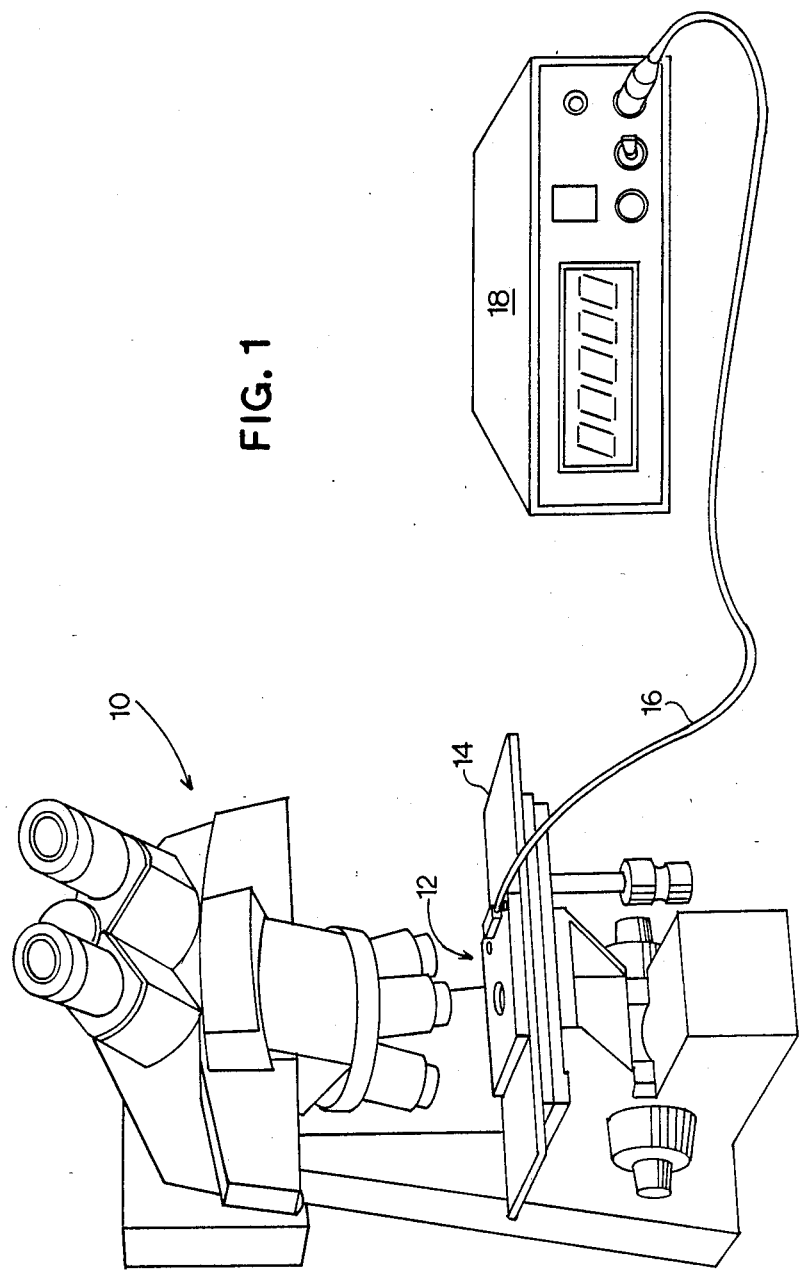
FIG. 1 is a perspective view of a microscope having affixed to the stage thereof a thermal stage in accordance with the present invention electrically connected to a controller.

Turning first to FIG. 1 there is shown a microscope for use in conjunction with the thermal stage of the present invention. The thermal stage, indicated generally by the numeral 12, is depicted affixed to the microscope stage 14. Power to the thermal stage is provided via cable 16 from a controller 18. The thermal stage is selectively attachable to existing microscopes to provide an efficient conversion to a temperature controlled microscope. When in place as shown in FIG. 1, the regulating controller may be set to the desired temperature. When the desired temperature is achieved, as shown on the read out of the controller, a specimen slide or dish may be placed on the thermal stage for observation.

Figure 2:
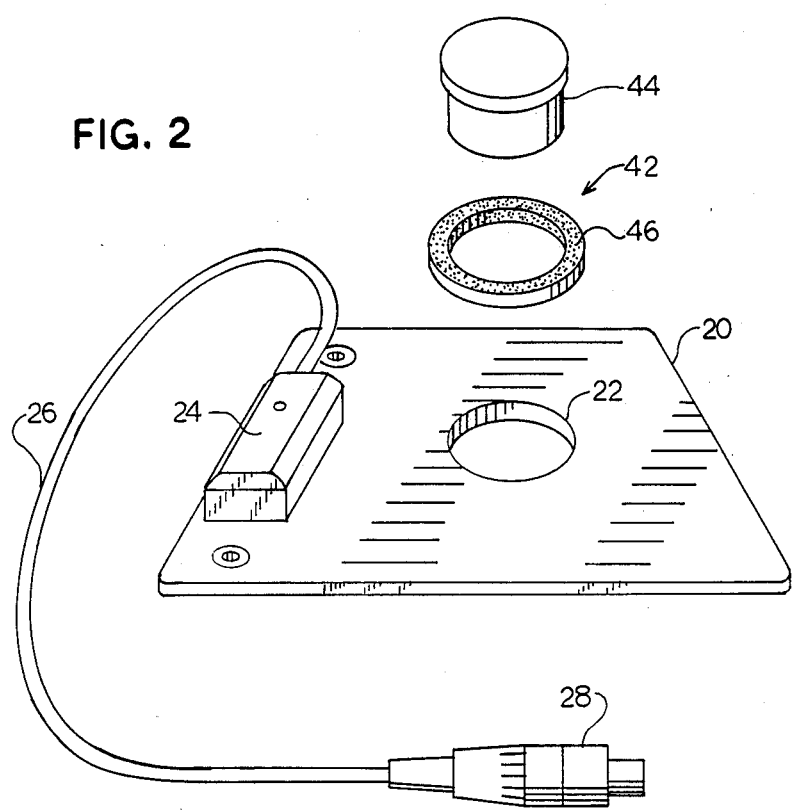
FIG. 2 is a perspective view of the thermal stage of FIG. 1 in accordance with the present invention and showing in addition a thermal ring arranged for affixation to the thermal stage, and further showing a specimen dish for insertion within the thermal ring.
Figure 3:
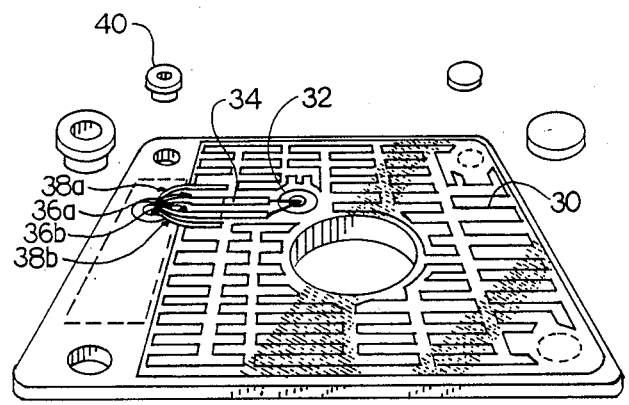
FIG. 3 depicts the bottom view of the thermal stage of the present invention showing the thermistor sensor and the non-inductive heating element.

This thermal stage is depicted in more detail in FIGS. 2 and 3 wherein a conductive planar member 20 is provided having an aperture 22 arranged in the center thereof for alignment with the aperture in the microscope stage for transmission of light to the specimens. Electrical interconnection to the controller is provided to the underside of the board through a strain relief member 24, through cable 26 and connector 28. This cable carries power to the thermal stage as well as the electrical connection to the temperature sensor described more fully below.

The heating element 30 of the present invention is a non-inductive heating element pattern composed of a metallic electrically conductive but resistive film. This pattern may be produced by etching or printing or in accordance with other methods commonly known in the industry. To provide and regulate heat to the specimen, the pattern is arranged to circumscribe the aperture closely and thereby provide heat in the closest proximity to the specimen. A thermistor heat sensing element 32 is provided at one coordinate near the aperture to sense the temperature at the closest proximity to the specimen. Due to the heat loss around the aperture, by sensing and controlling the temperature at this point the temperature of the specimen is accurately regulated.

Lands 34 are arranged to connect the thermistor heat sensor to leads 36 feeding to the cable 26. Similarly, electrical connection to the heating element is provided through lands 38. To further avoid the thermal inertia and thermal lag, there is provided insulating bushings 40 for supporting the thermal stage and thermally isolating it from the microscope base stage. In the preferred embodiment of the present invention, the planar member is comprised of a thin copper plate having low thermal inertia. By isolating this thermal stage from the microscope, the thermal inertia is further decreased and temperature control is improved.

In biological research it is a common practice to maintain the specimens in a petri dish instead of on a slide. In accordance with this practice, there is provided, in yet an additional feature of the present invention a thermal ring 42 arranged to receive the specimen dish 44. This ring is thermally conductive and affixed to the thermal stage at a location circumscribing the aperture. A teflon washer is affixed on its upper surface which protrudes over its inner edge to provide a lubricated sealing fit with the specimen dish when it is placed within the ring. Use of this ring provides better heat coverage around the specimen dish and prevents air drafts circulating past the dish.

Figure 4:
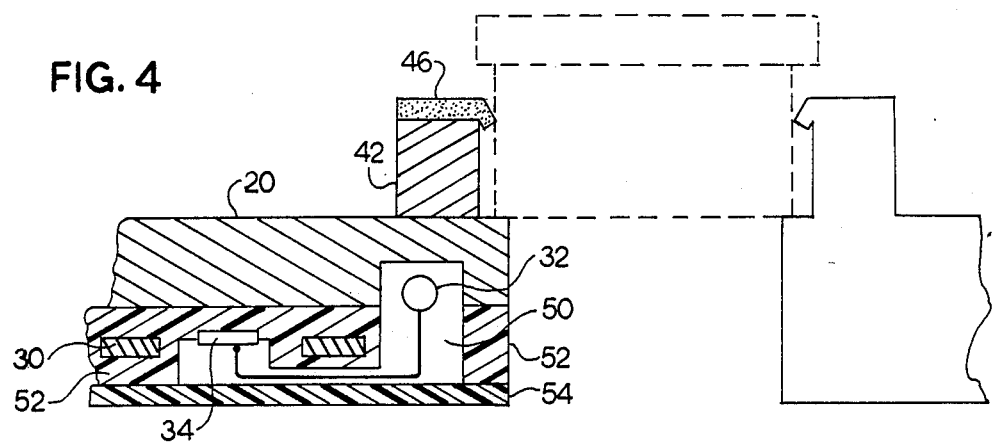
FIG. 4 is a cut away view of a thermal stage with the thermal ring in place showing the relationship of the thermistor sensing and the electrically non-conductive, but thermally conductive encapsulation of the electrical heater element.

In an alternative embodiment of the present invention, shown in FIG. 4, enhanced temperature control is achieved by locating the thermistor temperature sensor within a pocket 50 protruding upwards into the thermal planar member 20. In this position the temperature sensed by the thermistor more closely approximates the temperature of the specimens than the temperature sensed on the undersurface of the planar member. A further stabilizing effect is obtained by suspending the thermistor within the air in the pocket 50 to eliminate transient effects.

In the cross section shown in FIG. 4, the conductive heating element 30 is shown separated from the thermal planar member 20 and surrounded by a heat conductive plastic material 52. In the preferred embodiment this material would be an electrical insulator such as Kapton made by Dupont Corporation. In the construction of the thermal stage, a layer of Kapton is applied to the planar member and the heating element pattern is applied over the Kapton. Finally, the electrical heating element is sealed with a finishing layer of Kapton. When the final layer of Kapton is applied, the connection lands 34 and 38 are left exposed. During assembly the thermistor is positioned within the pocket 50 and the leads are electrically connected to the exposed lands. Finally, a closure strip 54 of Kapton is applied over the leads and lands to seal the device.

Figure 5:
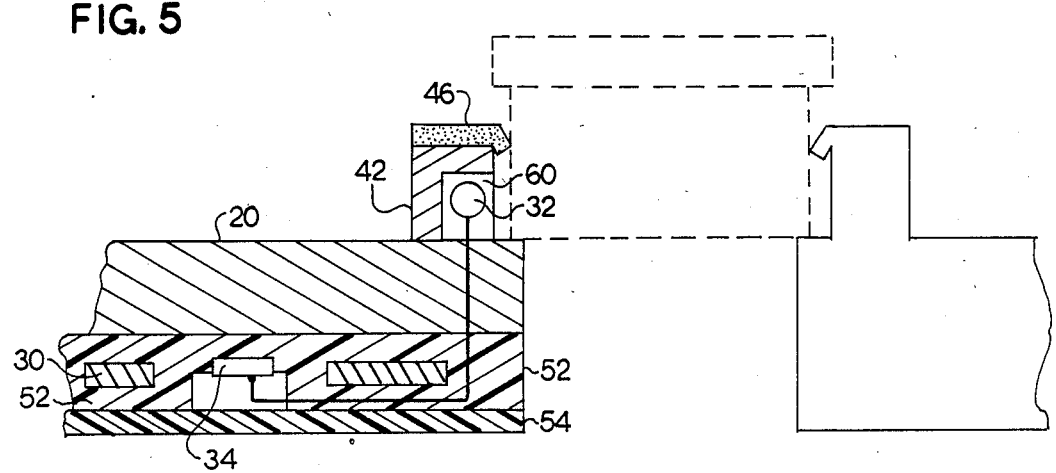
FIG. 5 depicts a cut away view of the thermal microscope stage with the thermal ring in place similar to FIG. 4, but showing an alternate positioning of the thermistor temperature sensor.

In yet another embodiment of the present invention, as depicted in FIG. 5, there is provided a pocket 60 located within the thermal ring for placement of the thermistor temperature sensor. In some applications, this placement more accurately reflects the temperature within the specimen dish. This assembly procedure is the same as that described with respect to the embodiment depicted in FIG. 4 with the exception that the thermistor 32 is positioned in the thermal ring proximate the point of contact with the specimen dish. With this arrangement the temperature within the specimen dish stabilizes to the same temperature as that of the pocket 60.

Figure 6:
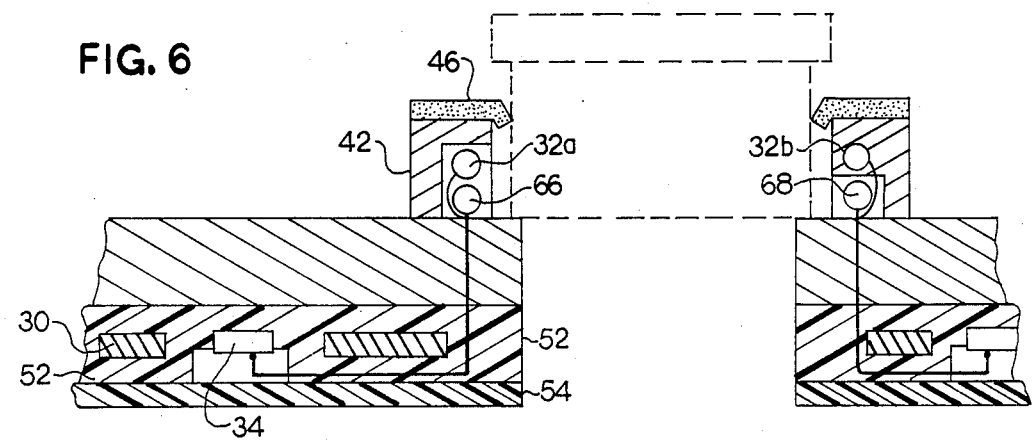
FIG. 6 depicts a cut away view showing a thermistor positioning similar to FIG. 5, but also showing a photo detection circuit for sensing the position of the specimen dish.

When this ring sensing embodiment is in constant use, the temperature stabilizes at the selected temperature with limited deviation. But when in irregular use, temperature stabilization can be improved by automatically switching temperature sensing duties from thermistor 32a located in air pocket 60 to a second thermistor 32b mounted in thermal ring 42 monitoring its temperature when no dish is inserted into the ring. In this embodiment, as shown in FIG. 6, there is provided a photo detector comprising a photo transmitter 66 and a photo receiver 68. This photo detector comprises circuitry commonly known in the art and functions to switch the temperature sensing location from the air pocket 60 to the thermal ring itself when the beam between the transmitter and receiver is uninterrupted. This avoids the problem of air drafts affecting the temperature sensing element and generating oscillations in the controlling equipment.

The controller 18 used with all the above embodiments is a proportional temperature indicating controller commercially available from Thermalogic Division of Dytron, Inc. This proportional controller limits the power input to the heating element in proportion to the proximity to the desired temperature. As a result, when used with the thermal stage design of the present invention the desired temperature is achieved quickly with minimal overshoot -- a result unavailable in the prior art. The proportional controller functions by controlling the ratio of "ON" cycles to "OFF" cycles. With a great disparity between the sensed temperature and the desired temperature, the controller will provide power during a greater proportion of "ON" cycles to "OFF" cycles; whereas when the desired temperature is approached the duty cycle approaches one to one.

From the foregoing description, it will be apparent that modifications can be made to the apparatus and method for using same without departing from the teaching of the present invention. Accordingly, the scope of the invention is only to be limited as necessitated by the accompanying claims.

I claim:

1. A heating device adapted to be placed onto the stage of a microscope and provide heat to a specimen within a container thereon comprising:
   a planar member exhibiting an aperture therein and having a pattern of electrical heating means distributed across one surface thereof and comprising a pattern extending proximate said aperture;
   temperature sensing means affixed to said planar member;
   electrical power controlling means electrically connected to said heating means and said temperature sensing means to provide accurate temperature control of a sensed temperature; and
   a thermally conductive ring member arranged to circumscribe said aperture for holding the container therein,
   wherein said ring member exhibits anti-friction means on an upper inside edge thereof to facilitate insertion of the specimen container.

2. A heating device adapted to be placed onto the stage of a microscope and provide heat to a specimen within a container thereon comprising:
   a planar member exhibiting an aperture therein and having a pattern of electrical heating means distributed across one surface thereof and comprising a pattern extending proximate said aperture;
   means for sensing temperature proximate the container
   electrical power controlling means electrically connected to said heating means and said temperature sensing means to provide accurate temperature control of a sensed temperature; and
   a thermally conductive ring member arranged to circumscribe said aperture for holding the container therein,
   wherein said ring member exhibits a cut away pocket therein for maintaining an air pocket between a portion of said ring and the specimen container, and wherein said temperature sensing means is mounted to extend into said air pocket.

3. The heating device of claim 2 further comprising photo detection means for reducing power to the heating device during absence of a specimen container.

* * * * *